UNITED STATES PATENT OFFICE.

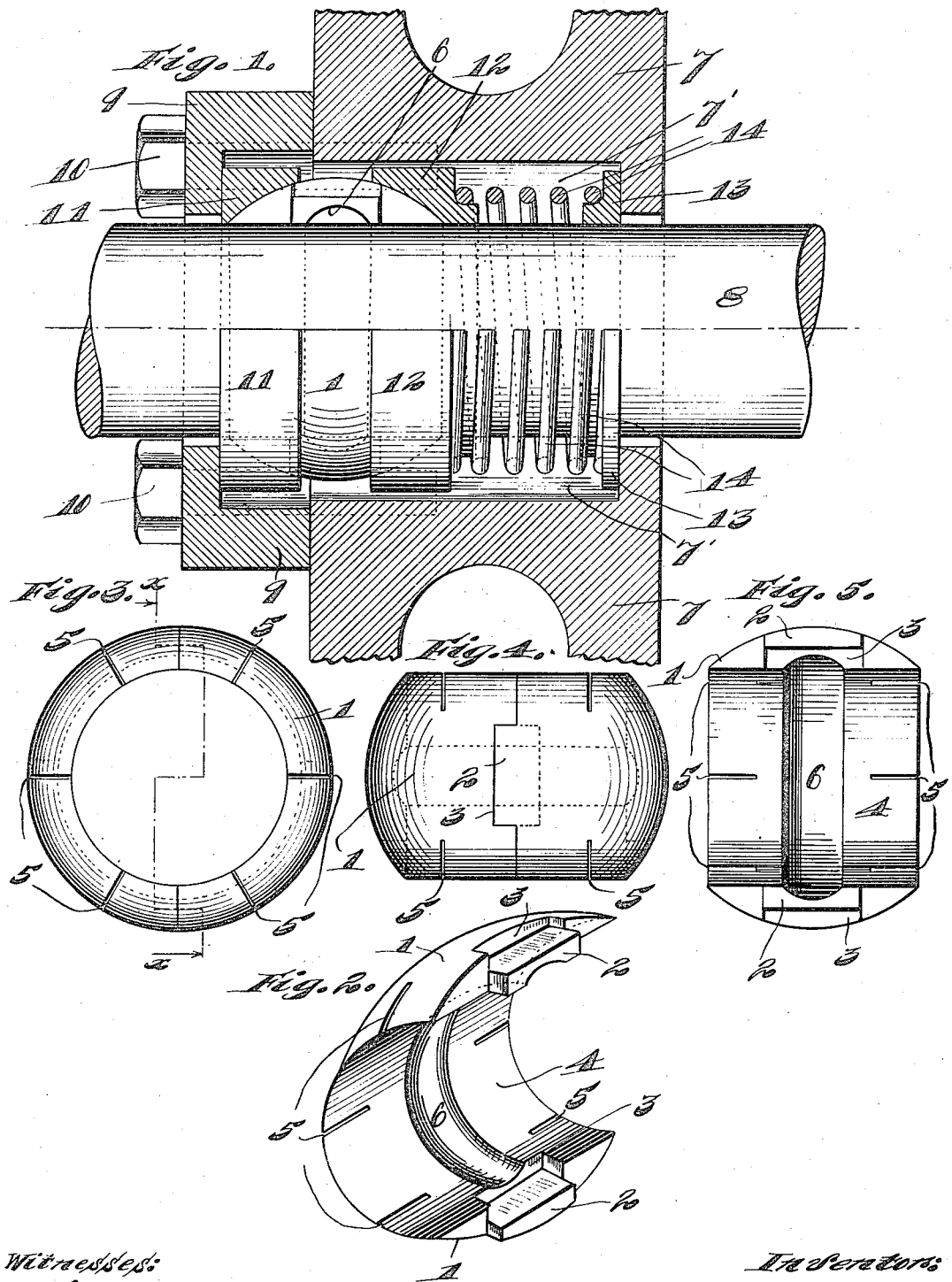

JAMES JOSEPH CLARK, OF NASHVILLE, TENNESSEE.

METALLIC PACKING-RING.

1,060,586.

Specification of Letters Patent. Patented May 6, 1913.

Application filed September 9, 1912. Serial No. 719,351.

*To all whom it may concern:*

Be it known that I, JAMES J. CLARK, a citizen of the United States, and a resident of the city of Nashville, county of Davidson, and State of Tennessee, have invented certain new and useful Improvements in Metallic Packing-Rings, of which the following is a specification.

My invention relates to improvements in metallic packing rings and has for its object the provision of a device of this character which is of simple construction and efficient in operation.

The invention consists in the combinations and arrangements of parts hereinafter fully described and claimed.

The invention will be best understood by reference to the accompanying drawings forming a part of this specification and in which, Figure 1 is a sectional view illustrating a packing in position for use, Fig. 2 is a perspective view of one of the halves of a packing member employed in this construction, Fig. 3 is an end view of the packing member, Fig. 4 is a plan view of the packing member, and Fig. 5 is a section of the packing member taken on line $x$—$x$ of Fig. 3.

The preferred form of construction as illustrated in the drawings comprises a spherical packing member consisting of two similar parts 1, each of which is provided at both ends with a lug 2 and a notch 3 fitting the corresponding parts on the other to form a dove-tailed joint between the two parts. The packing member thus formed is provided with a central opening 4 for the accommodation of the piston rod or other member to be packed and the edges of each member to be packed and the edges of each part are provided with radial slits 5 to admit oil to the interior thereof. An annular oil groove 6 is formed centrally in each of the members 1 in the outer wall of the opening 4 as shown.

The packing is seated in a recess 7' formed in cylinder head 7 surrounding the piston rod 8 which passes through said recess as shown. The outer open end of recess 7' is covered by a gland 9 which may be of any usual or desired construction and is held in position by means of bolts 10 as indicated. Compression rings 11 and 12 are fitted over the edges of the packing member parts 1 as shown, ring 11 being seated against the outer end of gland 9. Another ring 13 is seated against the bottom of recess 7' and a compression spring 14 is imprisoned between rings 12 and 13 and serves to press the ring 12 normally toward the ring 11 thus compressing the packing member onto piston rod 8. By this arrangement, it will be observed that the packing member is entirely free to properly seat itself upon piston rod 8 when steam under pressure is in the corresponding end of the cylinder, this pressure will be transmitted through ring 12 and spring 14, and thus increase the compression of the packing member to effect a more perfect seal. When the pressure is relieved from the corresponding end of the cylinder, the pressure will also be lessened on the packing member thus decreasing friction on piston rod 8. The slits 5 and oil groove 6 will serve to keep the bearing surface of the packing member thoroughly oiled. It will also be observed that two bearing or sealing surfaces are provided in the packing member separated by an oil groove, which tends to render the packing very effective.

While I have illustrated and described the preferred form of construction for carrying my invention into effect, this is capable of variation and modification, without departing from the spirit of the invention. I, therefore, do not wish to be limited to the exact details as set forth but desire to avail myself of such variations and modifications as come within the scope of the appended claims.

Having described my invention, what I claim as new and desire to secure by Letters Patent is:

1. A packing comprising a packing member having a central opening for the member to be packed, said packing member being formed in two parts having exteriorly bearing surfaces separated by an annular oil groove, the parts of the packing member being arranged with radial slits communicating with the said bearing surfaces, substantially as described.

2. A packing comprising a packing member forming two spherical portions, provided with a central opening adapted for the reception of the member to be packed, said portions at their central part being formed with an exteriorly disposed annular oil groove and having bearing surfaces separated by said groove and radial slits arranged in the edges of said portion, substantially as described.

3. A packing comprising a packing member composed of two spherical portions, having a central opening adapted for the reception of the member to be packed, said portions being formed with annular oil grooves; and oppositely disposed bearing surfaces and slits arranged in said portions communicating with the said bearing surfaces, substantially as described.

4. A packing comprising a packing member composed of two interlocking portions, having a central opening adapted for the reception of the member to be packed; annular bearing surfaces formed on said interlocking portions in the central opening, adapted for engagement with the member to be packed, and having annular oil grooves disposed therebetween, the said interlocking portions being provided with radial slits communicating with the said bearing surfaces, substantially as described.

5. A packing comprising a packing member, composed of two portions provided at their opposite ends with a lug and a notch, adapted to fit the corresponding parts on the other and having a central opening for the member to be packed, the said portions having continuous bearing surfaces and being separated by an annular oil groove, substantially as described.

6. A packing comprising a packing member composed of two portions, having a central opening for the member to be packed, one of said portions being formed with end lugs and the other of said portions formed with notches, the said portions being adapted to fit together, the said packing member arranged with interior bearing surfaces and having continuous oil groove disposed between the said bearing surfaces; and radial slits communicating with the said central opening, substantially as described.

In testimony whereof I have signed my name to this specification in the presence of two subscribing witnesses.

JAMES JOSEPH CLARK.

Witnesses:
 CHAS. F. FITZGERALD,
 C. B. HOFFERT.